Patented Oct. 15, 1929

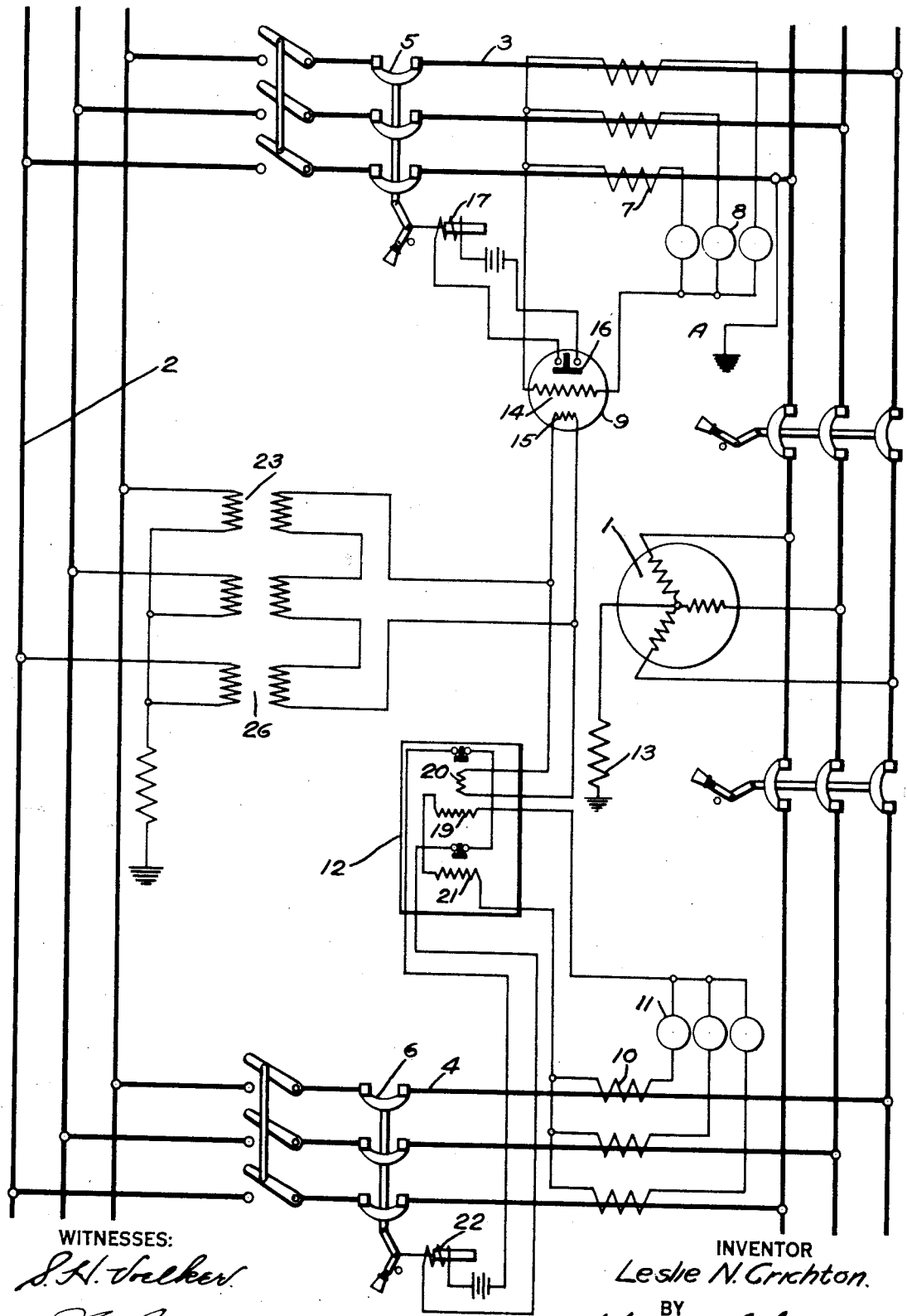

1,731,372

UNITED STATES PATENT OFFICE

LESLIE N. CRICHTON, OF WILKINSBURG, PENNSYLVANIA, ASSIGNOR TO WESTINGHOUSE ELECTRIC & MANUFACTURING COMPANY, A CORPORATION OF PENNSYLVANIA.

GROUND RELAY

Application filed August 11, 1923, Serial No. 656,780. Renewed April 9, 1925.

My invention relates to relays and particularly to relays for protecting electrical distributing systems against grounds.

One object of my invention is to provide a relay system for disconnecting a feeder circuit when a ground occurs thereon.

Another object of my invention is to provide a relay, for the above-indicated operation, that shall not be operated by currents that are produced by third harmonics.

A further object of my invention is to provide a power-responsive relay, for the above operation, that shall be very sensitive to small values of current, and that shall be simple and reliable in its operation.

Heretofore, relays for protecting electric circuits against grounds have been inserted in the common neutral conductor between current transformers and the overload relays. Such relays, however, have not been satisfactory because they required too much energy to operate, or they required additional current transformers in systems wherein the ratios of the transformers that were employed for the instruments and other relays were too high for the ground relay. Other relays and systems are not adequately protective because selective operation is not obtained when the value of the ground current is less than the value of normal load current and the relays are not selective because of the difficulty in obtaining an inverse time element in the operation thereof and because the relay has no directive element. Such relays are further undesirable since they are responsive to third harmonics in the system to which they are connected.

In view of the above conditions, I provide for the protection of a circuit in a power system, a power or watt relay comprising a current and a voltage winding, the former of which is so connected in circuit with the common neutral conductor between the current transformers and overload relays or instruments as to be energized in accordance with the magnitude of the residual current, and the latter of which is connected at one vertex between the two adjacent secondary windings of the potential transformers. The secondary windings of the transformers together with the potential winding of the relay are connected in closed delta relation and the primary windings are connected to the main system which is grounded at the generator.

A ground protecting system embodying a relay connected in the above manner overcomes the aforementioned disadvantages, since little energy is required and since the relay is selected in that it has both a directive and an inverse-time-element characteristic in its operation, and is not responsive to third harmonics of the system.

The single figure of the accompanying drawing is a diagrammatic view of an electrical system illustrating the connections of the relays associated with two circuits of a power system.

A source 1 of electromotive force, such as a generator, supplies energy to a remote section 2 of a power system through two parallel distributing circuits 3 and 4. The circuits 3 and 4 are provided, at their remote ends, with circuit interrupters 5 and 6, respectively. The system is grounded at the generator through a suitable resistor 13.

The distributing circuit 3 is provided with a plurality of current transformers 7 for energizing a plurality of overload relays 8 and a ground relay 9. The circuit 4 is similarly provided with a plurality of current transformers 10, overload relays 11 and a ground relay 12.

The ground relay 9 comprises a current winding 14, a voltage winding 15 and a switching device 16 that is controlled to close the circuit of the trip coil 17 associated with the interrupter 5 when the relay 9 is energized to a predetermined degree.

The winding 14 is connected in circuit with the neutral conductor between the current transformers 7 and the overload relays 8 and will therefore be energized only upon the occurrence of a ground upon one of the conductors in the circuit 3 which causes a residual current to circulate in the neutral connection of the current transformers.

The ground relay 12 is illustrated as of a different type and is provided with a directive element comprising a current winding 19 and a potential winding 20, and with a current element 21. Each element controls a switching device and both must be simultaneously closed to complete the circuit of a trip coil 22 that is associated with the interrupter 6. When the relay 12 is energized to a predetermined degree by energy flowing in a predetermined direction, both switching devices close.

In order to provide voltage for the potential windings of the ground relays 9 and 12, a plurality of potential transformers 23 are provided, the primary windings of which are connected between the conductors of the section 2 of the system and ground. The secondary windings of the potential transformers 23 are connected in closed delta relation with the potential windings 15 and 20 of the ground relays 9 and 12, at one of the vertices of the delta.

So long as there is no ground upon the system other than that provided, and so long as the voltages of the system are balanced, no current will traverse the secondary windings of the potential transformers and the potential windings of the relays will not be energized. Likewise, so long as the distribution circuits 3 and 4 are free of grounds, the current windings 14 and 19, 21 will not be energized.

However, when a ground occurs upon a conductor of the circuit 3, as at the point A, a circuit will be completed through that conductor and one phase winding of the generator through the limiting resistor 13 which will be traversed by a current, the value of which will depend upon the resistance of the ground and the value of the limiting resistor 13.

The generator will also tend to send current to the ground at A through the circuit 4 and back through the circuit 3. Since the current traversing the circuit 4 will be in the normal direction of energy flow, the ground relay 12 will not operate in a direction to close the switching device of the element 21 but, instead, will tend to maintain that device open. The ground relay 9, however, will be energized to operate in a direction opposite to that occurring during energy flow in the normal direction, that is, toward the circuit section 2, and the relay will therefore close its switching device 16. The interrupter 5 will thereupon be opened to disconnect the faulty circuit 3 from the circuit section 2. Proper protective apparatus disposed at the main generating station, but which is not here illustrated inasmuch as it does not enter into the present invention, will disconnect the faulty circuit 3 at the generating end and thereby isolate it to permit the remainder of the system to operate normally.

When the ground occurs at the point A, the potential transformer 26 is not energized sufficiently to induce an electromotive force in its secondary winding that will balance the electromotive force induced in the other transformers. A resultant current will therefore be caused to traverse the closed circuit of the secondary windings that will energize the potential winding 15 of the ground relay 9. The current winding 14 will also be energized through the current transformer 7. The two windings 14 and 15, when thus energized, cooperate to actuate the moving member of the relay, which is preferably of the induction disc type, to close the switching device 16 to energize the trip coil 17 and open the circuit interrupter.

When a ground relay of the type illustrated in association with circuit 4 is employed, the disconnection of the faulty circuit is precluded until, or unless, the ground current attains a predetermined value.

Since only the relay that is associated with a faulty feeder circuit will have both of its windings properly energized, the relays will be selective and will isolate only the faulty circuit of the system.

The factors that are required for the operation of the relays are the unbalance effects produced both in the currents that traverse the conductors of the associated feeder circuit and those that are produced in the ground currents that traverse the windings of the potential transformers.

Although the several elements of a protective system are illustrated as arranged in one manner, such arrangement may be readily changed without affecting the cooperation of the different elements and without departing from the spirit and scope of the invention, as set forth in the appended claims. However, I do not claim broadly in this application the use of a watt relay for ground protection, the broad claims to such a system being in my co-pending application, Serial No. 400,093, filed July 30, 1920.

I claim as my invention:

1. In a polyphase distributing system, the combination with a feeder circuit and an interrupter between the system and the feeder circuit, of a plurality of current transformers in the feeder circuit, a plurality of potential transformers energized from the system and a watt relay comprising two windings for controlling the actuation of the interrupter, one winding being connected in the neutral circuit of the current transformers and the other winding being connected in one vertex of a delta comprising the secondary windings of the potential transformers.

2. In a three-phase power system, the combination with a feeder circuit and a circuit interrupter therefor, of ground-detecting means for controlling the interrupter comprising a watt relay embodying a current and a potential winding, current transformers connected between the circuit and the current winding to energize the latter only when a ground occurs on the system, and potential transformers connected to the system and the secondary windings connected in closed delta relation with the potential winding of the relay.

3. In a three-phase power system, the combination with a feeder circuit and a circuit interrupter therefor, of ground-detecting means for controlling the interrupter comprising a current-responsive element, current transformers for energizing the element only upon the occurrence of a ground on a conductor of the feeder circuit, a voltage-responsive element, voltage transformers connected to the system, means for including the voltage-responsive element in circuit with the secondary windings of the potential transformers connected in closed delta, and means controlled by the cooperation of the current and the voltage-responsive elements for controlling the actuation of the circuit interrupter.

4. In a power system, the combination with a feeder circuit and an interrupter therefor, of three star-connected current transformers associated with the circuit conductors, three potential transformers connected to the system with the secondary winding connected in closed delta relation, a current element connected in the neutral circuit of the current transformers, a potential element connected in the delta composed of the secondary windings of the potential transformers, and means controlled by the cooperating effects of the current and the potential elements for controlling the operation of the interrupter.

5. In a power system, the combination with a plurality of feeder circuits provided with individual circuit interrupters and current transformers, of a plurality of potential transformers energized from the system with the secondary windings disposed in closed delta relation, a selective relay device associated with each feeder circuit and comprising a current element and a potential element, means connecting each current element to the associated current transformers to be energized only upon the occurrence of a ground upon one of the circuit conductors, means connecting each potential element in circuit with the secondary windings of the potential transformers, and means controlled by each relay for actuating the associated interrupter.

6. In a polyphase system of the class described, a device to be operated selectively in accordance with a ground on said system and means for controlling the operation of said device comprising two sets of transformers having primary and secondary windings connected to the system and the device, respectively, the secondary windings of one set of transformers being connected in star relation and the secondary windings of the other set of transformers being connected in closed delta relation.

7. In a polyphase system of the class described, a directional ground relay having two cooperating windings, means for energizing one of said windings in accordance with the residual current and means including potential transformers having closed delta-connected secondary windings for energizing the other relay winding, said other winding being connected in the delta.

In testimony whereof, I have hereunto subscribed my name this 10th day of August, 1923.

LESLIE N. CRICHTON.